Mar. 6, 1923.
F. MUELLER
ACCELERATOR
Filed May 15, 1922
1,447,807
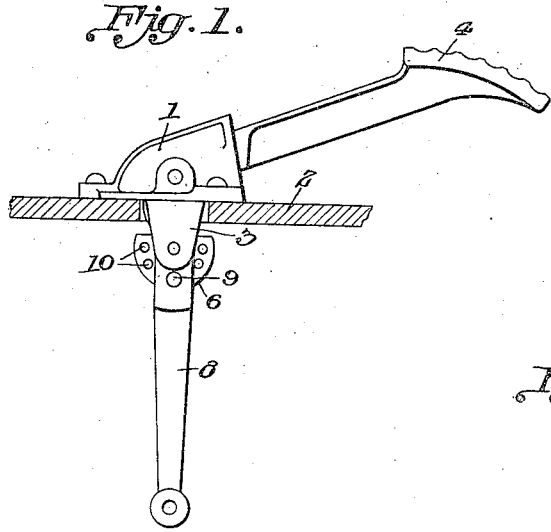
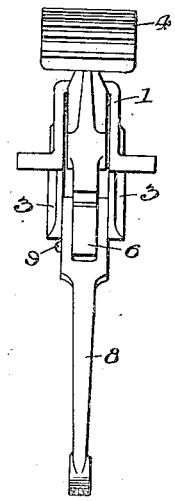
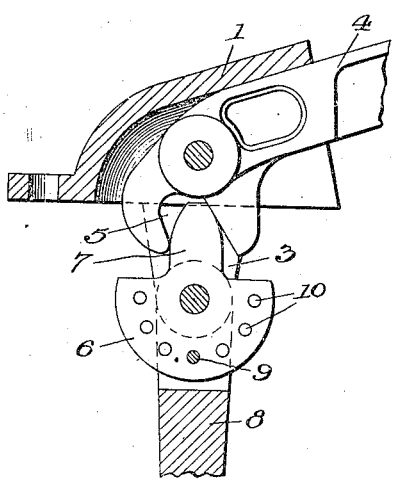
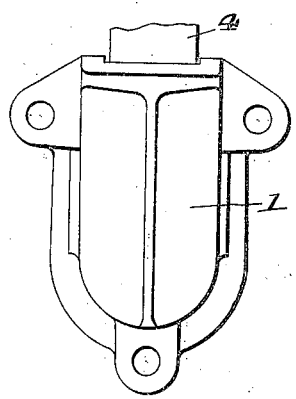
Frank Mueller
INVENTOR Patented Mar. 6, 1923.

1,447,807

UNITED STATES PATENT OFFICE.

FRANK MUELLER, OF SCRANTON, PENNSYLVANIA, ASSIGNOR TO MUELLER ENGINEERING COMPANY, OF SCRANTON, PENNSYLVANIA, A CORPORATION OF PENNSYLVANIA.

ACCELERATOR.

Application filed May 15, 1922. Serial No. 560,979.

*To all whom it may concern:*

Be it known that I, FRANK MUELLER, a citizen of the United States, residing at Scranton, in the county of Lackawanna and State of Pennsylvania, have invented new and useful Improvements in Accelerators, of which the following is a specification.

This invention relates to a foot accelerator for motor vehicles, the general object of the invention being to provide means whereby the throttle will be given a gradual opening movement by the depression of the accelerator pedal, the opening movement being quickened when the pedal nears the limit of its downward movement.

Another object of the invention is to provide means for adjusting the position of the parts of the accelerator so that it may be attached to throttle valves of different types of vehicles without interfering with the proper relative movements of the parts of accelerator.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a front view.

Figures 3 and 4 are detail views.

In these views 1 indicates a supporting bracket which is adapted to be secured to the floor board 2 of the vehicle. This bracket is provided with depending ears 3. The pedal 4 has its lower end pivoted in said bracket and said pedal has an extension which is provided with a substantially arc-shaped slot 5. A sector 6 is pivoted between the ears 3 and a large tooth 7 is connected to the sector and engages the slot 5 of the pedal. A lever 8 has its upper end forked and pivoted to the pin which holds the sector in place between the ears. A pin 9 passes through holes in the prongs of the forked end and through any one of a plurality of holes 10 in the sector. This lever is to be connected at its lower end with the throttle by the usual connecting links.

When the throttle is closed the pedal will be in its upward position, this position being limited by the upper part of the bracket. When the pedal is depressed the rear wall of the slot 5 will engage the tooth 7, thus rocking the sector and causing the same to move the lever 8 rearwardly to open the throttle. Due to the construction of the slot and tooth the opening movement is a gradual one and the farther the pedal is depressed the faster the lever will move.

By means of the connection of lever 8 with the sector said lever can be adjusted so that it can be properly connected with the throttle without changing the position of the tooth of the sector in the slot of the pedal. Thus the device can be placed on any kind of a motor vehicle without interfering with the ratio movement of its parts.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An accelerator for motor vehicles comprising a pedal having an elongated arc-shaped slot in its lower part, a lever adapted to be connected with the throttle of a vehicle and having a tooth thereon engaging the slot so as to secure a gradual opening of the throttle when the pedal is depressed.

2. An accelerator for motor vehicles comprising a support, a pedal pivotally secured to the support and having an extension at its lower end provided with an arc-shaped slot, a lever pivoted to the support and a tooth connected with the lever and engaging the slot.

3. An accelerator for motor vehicles comprising a support, a pedal pivotally secured to the support and having an extension at its lower end provided with an arc-shaped slot, a lever pivoted to the support, a tooth connected with the lever and engaging the slot and means for adjusting the lever without changing the position of the tooth in the slot.

4. An accelerator for motor vehicles comprising a support, a foot pedal pivotally mounted therein and having a slotted extension, a sector pivotally mounted in the support, a tooth thereon engaging the slot, a lever having its upper end pivotally connected with the support and means for adjustably connecting said lever with the sector.

5. An accelerator for motor vehicles comprising a support, a foot pedal pivotally mounted therein and having a slotted extension, a sector pivotally mounted in the support, a tooth thereon engaging the slot, a lever having its upper end pivotally connected with the support, means for adjustably connecting said lever with the sector, such means consisting of a pin adapted to engage any one of a plurality of holes in the sector.

In testimony whereof I affix my signature.

FRANK MUELLER.